United States Patent [19]
Atkinson et al.

[11] 3,872,711
[45] Mar. 25, 1975

[54] REMOTE TESTING SYSTEM FOR RAILROAD AIR BRAKES

[75] Inventors: William W. Atkinson, Moraga; Albert Leathem, El Cerrito, both of Calif.

[73] Assignee: Southern Pacific Transportation Company, San Francisco, Calif.

[22] Filed: Feb. 1, 1974

[21] Appl. No.: 438,848

[52] U.S. Cl. .................................................. 73/39
[51] Int. Cl. ............................................ G01m 3/02
[58] Field of Search ............................... 73/39, 121

[56] References Cited
UNITED STATES PATENTS
2,189,184  2/1940  Simpson............................... 73/39

*Primary Examiner*—James J. Gill
*Attorney, Agent, or Firm*—Lindenberg, Freilich, Wasserman, Rosen & Fernandez

[57] ABSTRACT

Apparatus for testing the air brake system of a railroad train or cut of cars in a rapid and highly reliable manner which requires connection only to the head end of the train, including an automatic control for supplying high pressure air to the head end of a train brake system through an orifice for at least a predetermined period such as 11 minutes and then until a predetermined pressure such as 75 psi is reached at the head end, to assure complete charging of the train brake system for a wide range of train lengths, without requiring the reading of a gauge at the rear of the train.

5 Claims, 3 Drawing Figures

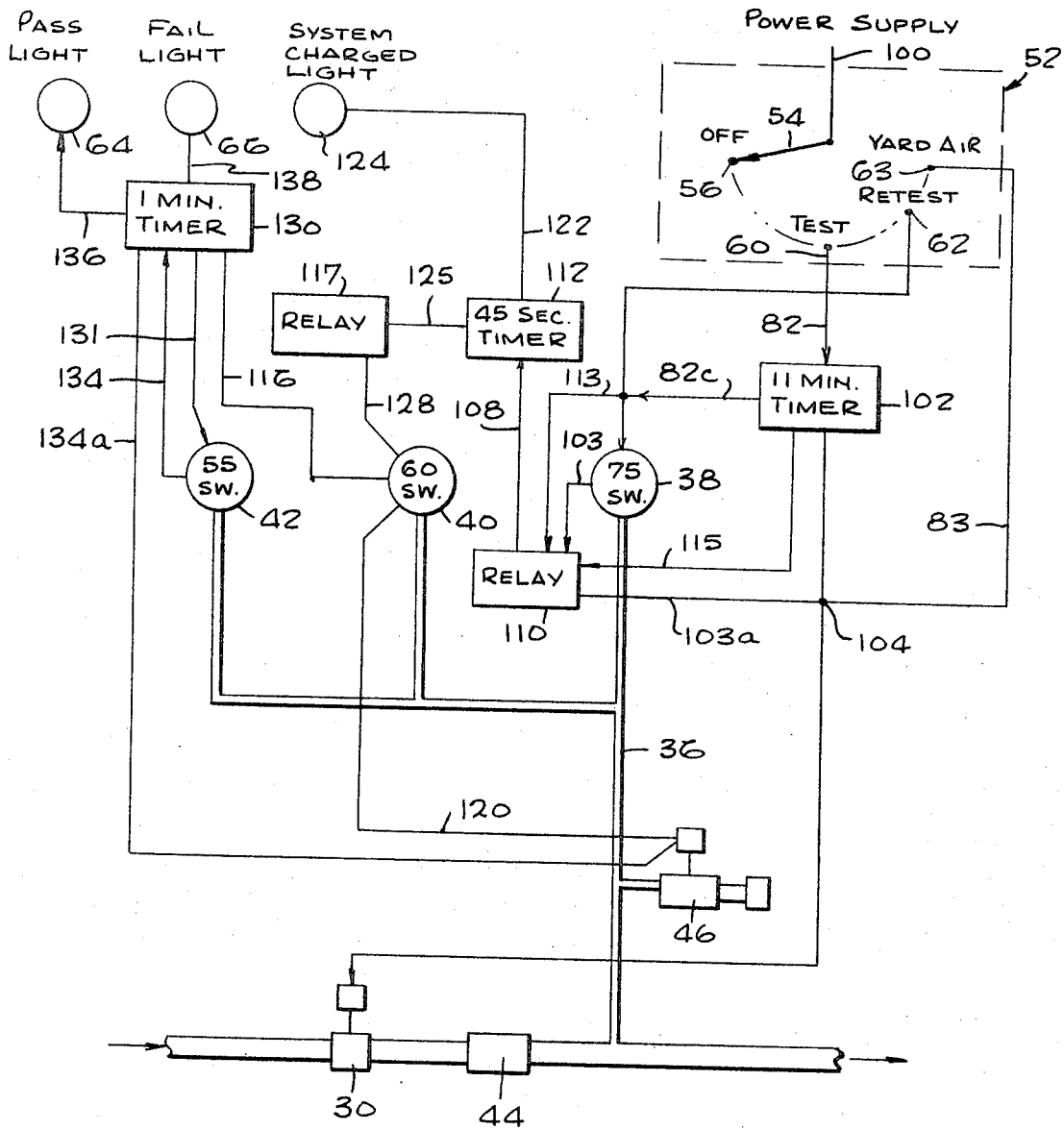

REMOTE TESTING SYSTEM FOR RAILROAD AIR BRAKES

BACKGROUND OF THE INVENTION

This invention relates to apparatus for automatically testing the air brake systems of trains.

A train or cut of cars is typically assembled in a yard with the cars extending downtrack from a head end car which later may be connected to a locomotive or made part of a train, and with the air hoses of the cars connected together. The air brakes must be tested by charging the air system and checking for leakage. This can be accomplished by connecting a yard air supply to the head end, connecting a pressure gauge at the caboose end, and allowing the system to charge until a predetermined pressure such as 75 psi is reached at the caboose. Measurement at the caboose is used because the air pressure can vary considerably along the brake system, especially for very long trains. After the air system has been charged, the pressure is reduced to a lower level such as 60 psi. The system is closed for a period such as one minute, and a measurement is then taken to make sure that at least 55 psi remains, which assures that the air leakage is small.

The foregoing manual testing procedure is often inacurate and time consuming. The workmen may spend considerable time in walking between the head end and caboose, since some trains may be a mile long and the manual operating values are at the head end. In very hot or cold weather when workmen prefer to remain indoors, there is a tendency to abbreviate the test, as by charging to less than regulation initial pressure and by discounting or rationalizing moderately excessive leakage. A testing system which minimized the possibility of carelessness while also minimizing the amount of time spent by workmen at the trains, would provide reliable brake system testing and at minimum cost.

SUMMARY OF THE INVENTION

In accordannce with one embodiment of the invention, apparatus for testing air brake systems is provided which assures high reliability at minimum cost. The system includes ground level apparatus with a yard air supply, relays, timers, control valves, and pressure transducers located at a selected position along the railroad track. Electric wires extend from the ground level apparatus to an operating remote control panel that is programmed to perform a required test, and which provides a definite pass or fail indication. A train to be tested is parked along the track so the head end is near the air supply and ground apparatus, and a connection is made only to the head end of the train. The workmen may then go indoors or proceed to other work, while a test is performed by personnel at the control panel or console which may be located in a control tower.

The test is begun by manipulating a switch at the control console which operates a solenoid valve so the yard air supply can charge the train brake system to a high pressure such as 75 psi. An assurance is provided that the train brake system will be adequately charged for a wide variety of train lengths, even through pressure measurements are taken only at the head end of the train. This is accomplished by utilizing a timer that keeps the value open for approximately 11 minutes regardless of the pressure at the head end, and by also utilizing a pressure tranducer that can keep the value open after the end of the timing period until the pressure at the head end reaches 75 psi. A pressure reduction to 60 psi at the head end and throughout the cut of cars is then performed and a one minute test interval is allowed to elapse to determine whether the leakage is great enough to decrease the pressure to 55 psi at the head end. The attainment of 55 psi during the one minute interval automatically turns on a " fail" indicating light, while the absence of a reduction to 55 psi calls for a full reduction to 55 psi and then automatically turns on a "pass" indicating light. Thus, workmen have to make connections only at the head end of the train and do not have to wait by the train during the test, and yet uniformly high testing accuracy is assured for trains of a wide variety of lengths.

The novel features that are considered characteristic of this invention are set forth with particularity in the appended claims. The invention will best be understood from the following description when read in connection with the accompanying drawings.

BRIEF DESCRIPTION OF THE DRAWINGS

FIG. 3 is a more detailed schematic view of the testing system of FIG. 2.

DESCRIPTION OF THE PREFERRED EMBODIMENT

Figure 1:
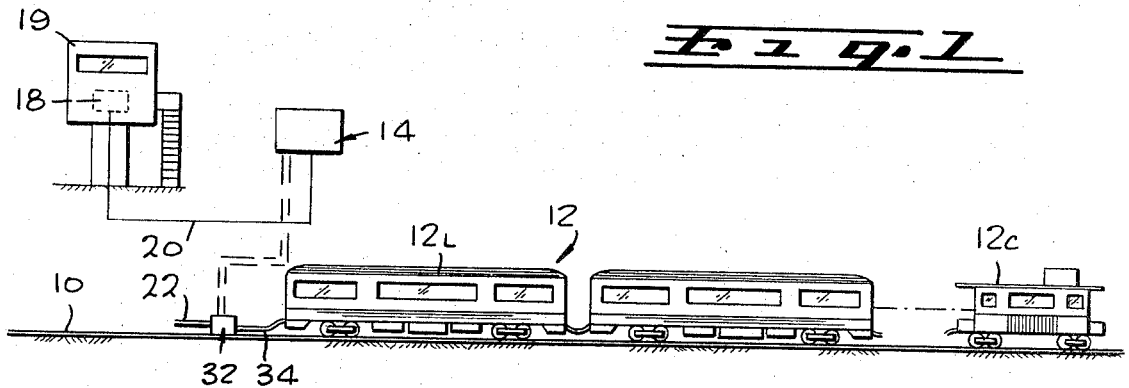
FIG. 1 is a simplified pictorial view of a train yard and testing system constructed in accordance with the present invention.

FIG. 1 illustrates a portion of a railroad yard which includes a track 10 that can hold a cut of cars 12 whose brake system must be tested for leakage. The testing system includes a trackside valve, sensor, and control complex 14 at a selected position near the track 10 and a control panel 18 that may be located in a control tower 19 remote from the trackside complex 14 but which is connected thereto by electrical conductors 20. A pipe 22 which is connected to a central air supply, extends to the trackside complex 14 to supply pressured air thereto. The train 12, which typically has been recently assembled at the yard, is parked along the track with the lead car 12L which later may be connected to a locomotive, positioned near the trackside complex 14. The caboose or rear car 12C may be located at a wide variety of distances downtrack from the lead car, depending upon the length of the train, without affecting the accuracy of the test procedure. After the train has been parked, a workman connects a hose 34 from the complex 14 to the hose at the lead car 12L, and he then signals an operator at the control panel 18. The workman at the train can then perform other duties, while the operator at the control panel initiates the test.

Figure 2:
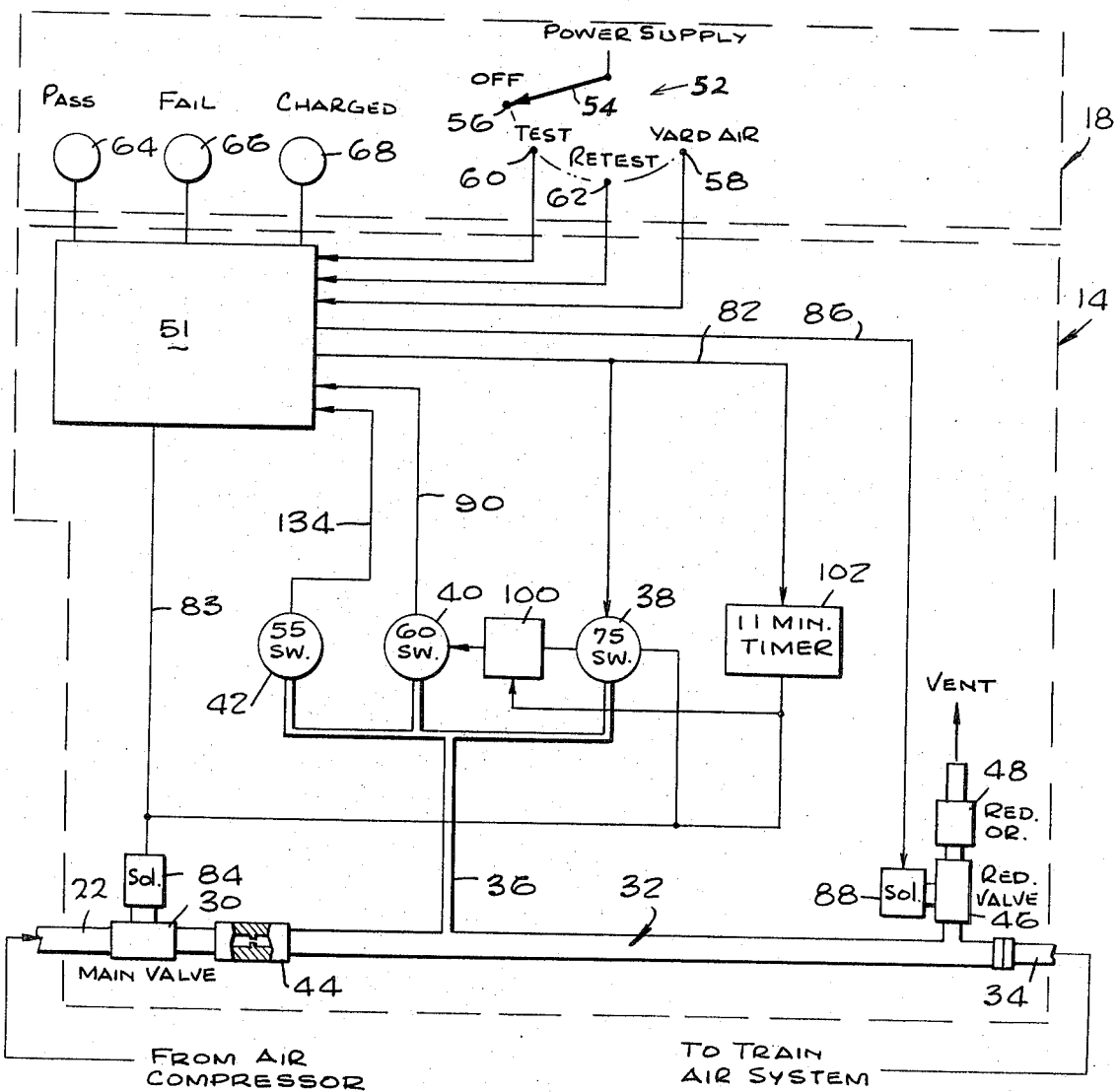
FIG. 2 is a simplified block diagram and side elevation view of the testing system of FIG. 1.

FIG. 2 illustrates the general arrangement of the testing system of FIG. 1. The valve and sensor complex 14 includes a main valve 30 which controls the flow of air from the pipe 22 that leads from the yard air compressor, through a coupling 32 to the hose 34 which extends to the train air brake system at the lead car of the train. A sensing tube 36 connects the coupling 32 to three pressure transducers 38, 40 and 42 which each contain an electrical switch set to switch state when a preset pressure of the sensing tube 36 is reached. Transducer 38 is set for 75 psi, which is the initial pressure to which the train brake system is charged. Transducer 40 is set at 60 psi, which is the pressure to which the brake system is reduced prior to detection of leakage. Transducer 42 is set at 55 psi to indicate that there is excessive leakage if this pressure is reached within a short period, and which is the pressure to which the brake system is reduced for any additional testing.

The valve and sensor complex 14 also includes an orifice 44 between the yard air pipe 22 and sensor tube 36, the orifice serving to limit the flow rate of air during charging of a train brake system. A reduction valve 46 is also provided to enable bleed-off of air from the train brake system so that the pressure therein can be reduced. The value 46 leads through a reduction orifice 48 to the atmosphere, the orifice 48 limiting the rate of venting to minimize the pressure gradient along the train brake system during pressure reduction.

The testing system is capable of performing a variety of test operations, in accordance with the setting of a control switch 52 which is moved by an operator at the control panel. The operator can move an arm 54 of the switch from an off contact 56 which had held the main value 30 closed, to a "yard air" contact 58 which causes the main valve 30 to be open, or to either of two testing contacts or positions 60, 62. When the switch 52 is moved to a "test" position at 60, the testing system performs a predetermined sequence in which the train air brake system is charged long enough to assure a close to 75 psi pressure throughout the train. The testing system then reduces the pressure to 60 psi, and a test is made as to whether the pressure leaks to 55 psi within one minute. When the switch is moved to a "retest" position at 62, a similar test procedure is performed, except that charging of the train air brake system is performed more rapidly by eliminating the requirement for charging for a predetermined time. The control circuit console 18 is provided with three indicator lamps that signal the test status. One indicator 64 is a white lamp which is energized if and only if the train brake system is properly charged, the leakage test has been properly performed and the train passes the test. A second indicator 66 is a red lamp which is energized if and only if a test has been performed and the train fails the test. A third indicator 68 is provided to indicate when the train air brake system has reached a charged state.

A train to be tested is parked along the track 10 with the lead car near the coupling 32 and with the hose 34 connected to the lead car. All hoses of the train are connected together and all train air valves are in proper position. A workman then signals the operator to begin the test. The operator then moves the switch arm 54 to the test contact 60. The testing system then automatically delivers current over a line 82 to the 75 psi transducer 38 and to a timer 102, which in turn deliver current to the solenoid 84 of the main valve 30 to open the valve. Air then passes from the yard air line 22 through the main valve and orifice 44, to the hose 34 that leads to the train air system. The yard air source is normally constructed to constantly supply air under a pressure of at least 82 psi. As the air lines in the train and the reservoirs therein become filled, the pressure at the coupling 32 and in the sensor tube 36 rises towards the 75 psi level.

When the pressure in the sensor tube 36 reaches 75 psi, current no longer flows from the transducer 38 to the main valve. However a timer 102 can prevent the main valve 30 from closing until a predetermined time of approximately 11 minutes has elapsed since the train brake system began charging. The purpose of the timer 102 is to assure that even short trains will be fully charged. It has been found that when trains with less than twenty cars are charged from 82 psi through an orifice 44 of 19/64 inch diameter, the pressure at the head end of the train reaches 75 psi before reservoirs at the caboose can charge to the minimum pressure of 60 psi which must exist at every location in the train brake system prior to the leakage test. The 11 minute timer 102 assures that short trains will be fully charged, while the 75 psi pressure switch 38 assures that even the longest trains will be fully charged prior to turn off of the main valve 30. This fuel arrangement of a pressure gauge and timer therefore automatically assures full charging of a wide variety of train lengths, without the need for installing a pressure gauge at the caboose or rear end of the train or cut of cars.

When 75 psi has been reached and the timing period is over, current from the 75 psi transducer 38 flfows through a relay 110 and through the 60 psi transducer 40 and a line 90 to the circuit 51, and thence through a line 86 to a solenoid 88 of the reduction valve 46 to open it. The reduction valve 46 then allows air to pass through reduction orifice 48 to the atmosphere to vent the train air system. The pressure reduction continues until the air pressure in the tube 36 reaches 60 psi. The 60 psi switch 40 then ceases to deliver current over line 90 to cease the flow of current to the valve 46 and close it. The signal (represented by the absence of current) from the 60 psi switch 40 over line 90, is also delivered to a one minute timer in circuit 51 to begin a one minute test for leakage.

The one minute test involves the determination of whether there is sufficient leakage in the train brake system to cause a reduction from 60 psi to 55 psi in one minute. At the end of the one minute period, the 55 psi pressure switch 42 will be sending a signal over lines 134 indicating whether or not a 55 psi level has been reached in the coupling 32. If a signal indicating that 55 psi has been reached is received by the circuit 51 prior to the end of the one minute testing period, then the fail indicating lamp 66 will be illuminated, to indicate that the train brake system failed the test. The system now stops with lamp 66 remaining illuminated until action is taken by the operator. On the other hand, if the one minute test period passes without the pressure reaching 55 psi, then the circuit 51 will deliver a signal over line 86 to the solenoid of the reduction valve to open it until the pressure is reduced to 55 psi. When the pressure switch 42 indicates 55 psi has been reached, after a signal on line 86 has been delivered to the reduction valve by the relay assembly, then the light 64 will be illuminated to indicate that the train brake system passed the test. Illumination of the pass-indicating light 64 also indicates that the train brake system is at the full service level and is ready for any further testing and/or piston travel check of the cars in the train or cut of cars.

If the train brake system fails the test, the operator in the control tower may place the selector switch 52 in the "yard air" position at 58, which results in a signal over line 83 to the main valve 30 to open it. This causes the train brake system to be recharged to a high pressure, to facilitate the detection of leaks and to prepare for another reduction and leakage test. After any leakage repairs have been made, the train brake system can be retested. The operator retests by moving the switch arm 54 to the retest position at 62. This results in the circuit 51 functioning in the same manner as in the test position at 60, except the 11 minute timer period is eliminated because the train air brake system has already been charged, so that when 75 psi is again reached at the coupling 32, all reservoirs will be charged. The rest of the procedure is the same as for the initial test. After the train system has satisfactorily passed the leakage test, and with the system at 55 psi, the car men can make the necessary piston travel check of brakes, to check for binding or fouling of brake rigging, and to see that all parts of the brake system are properly secured.

A variety of circuits can be utilized to perform the functions of the testing system of FIG. 2, FIG. 3 being a more complete illustration of one such system. As shown in FIG. 3, the arm 54 of the selector switch 52 is connected through line 100 to a power supply. When the switch 52 is at the test position 60, current flows through line 82 to the 11 minute timer 102 to begin the charging time period, the current also flowing through line 82c to the 75 psi pressure switch 38. Thus, the switch 52 serves as a starting means to place the transducer 38 and timer 102 in operable states to begin the testing sequence. Initially, current flows through the pressure switch 38, along a conductor 103, out of relay 110 and through line 103a to a junction 104 to the main valve 30 to keep it open. Current also flows through the 11 minute timer 102 to the junction 104 and to the valve 30 to keep it open. When the 75 psi switch 38 detects a pressure exceeding 75 psi, this switch operates to no longer supply current over line 103a to keep the main valve 30 open. Similarly, after the 11 minute timing period, a switch in the timer 102 opens so that current is no longer delivered through the timer to the main valve 30 to keep it open. Thus, after both 75 psi has been reached and the 11 minute period has passed, the main valve 30 is allowed to close. It may be noted that the timer 102 is a type which automatically resets when current to it is removed. Thus, an 11 minute timing period automatically begins when the switch arm 54 is turned to the test position at 60, Also, the 75 psi transducer 38 is automatically ready to switch at 75 psi when air pressure is applied to it from sensor tube 36.

When the pressure switch 38 detects a pressure exceeding 75 psi, it can operate relay 110 to that relay 110 delivers current over a line 108 to a 45 second timer 112. However, relay 110 does not operate to deliver current over line 108 until it ceases to receive current over line 115 from the 11 minute timer, which occurs after the timing period has elasped. Relay 110 remains energized through line 113 until current is removed therefrom, which occurs only when the selector switch 52 is switched away from the test position of contact 60. Thus, after both 75 psi has reached and the 11 minute period has been passed, current flows to the 45 second timer 112.

The 45 second timer 112 provides current through wire 122 to a system charged light 124, for 45 seconds to iniidate that the train brake system has been charged and is being allowed to equalize. After the 45 second period current flows from the 45 second timer only over line 125 to relay 117 and light 124 goes out. Relay 117 supplies current through wire 128 to the 60 psi pressure switch 40, so that control of operation is transferred to this switch 40.

So long as the 60 psi pressure switch 40 senses a pressure of greater than 60 psi, it delivers a current over line 120 to the reduction valve 46 to open it and thereby reduce pressure in the train brake system towards the 60 psi level. When the 60 psi level is reached, the pressure switch 40 is operated, and it thereafter delivers current only over a line 116 to a one minute timer 130.

When the 60 psi switch 40 begins delivering current over line 116 to timer 130, the leakage test period has begun and therefore the train brake system is being tested for excessive leakage. Current from the one minute timer 130 is delivered over line 131 to the 55 psi pressure switch 42. If the 55 psi pressure switch 42 detects a pressure less than 55 psi, at any time during the one minute timing period of timer 130, then it delivers a signal on line 134 that causes the one minute timer to deliver current from line 138 to the fail indicating lamp 66 which will be energized to indicate that the leakage test has been failed. At this time the system stops until other action is taken by the operator and the fail light 66 will remain illuminated.

If the pressure exceeds 55 psi at the end of the one minute period, the timer 130 delivers current over line 134a to reduction valve 46. Thus, if the train brake system has a small enough leakage that the pressure exceeds 55 psi at the end of one minute, the system will reduce the pressure to the full service value. When the 55 psi pressure switch 42 detects 55 psi in sensor tube 36 it causes the timer 130 to stop current flow to the reduction valve 46, which then closes. At this time current passes over line 136 to pass light 64 which indicates that the air brake system has been charged, has passed the leakage test, and is ready for piston travel check. Normally, instead of utilizing only lamps at 64 and 66, latching relays are also utilized to keep the lamps illuminated indefinitely the latching relays being energized from the electric switch contacts 60 and 62. Other control relays are also used to further complete the circuit.

If a leakage test has been failed and it is necessary to make a retest, then the selector switch arm 54 is turned to engage the contact 63 which passes current over line 83 to junction 104 and to main valve 30 which opens to charge the system to a high pressure to help locate leaks. A retest is then started by placing arm 54 at contact 62. Current from contact 62 then passes along the same route as current would pass from the test contact 60, except that no current is supplied to the 11 minute timer 102. This system operates in the same manner as for the original test sequence, except that the pressure reduction to 60 psi begins as soon as 75 psi is sensed by the pressure switch 38.

After all testing, inspection and adjusting of the train or cut of cars air brake system has been completed, the operator can place arm 54 of the selector switch on contact 63. Contact 63 passes current on line 83 to junction 104 and to main valve 30 which then will remain open for an indefinite time to allow the air brake system to charge up to the yard air source of perhaps 82 psi.

Thus, the invention provides a system for testing the air reservoir and brake system of a train or cut of cars in a manner that permits operation from the head end of the train. The testing system of the invention accomplishes this by providing both a 75 psi pressure switch and 11 minute timer to assure complete charging of the train brake system for a wide variety of train lengths. The system permits testing to be accomplished in an automatic manner once a hose from a coupling assembly is connected to the head end of the train. Thereafter, testing is accomplished substantially automatically and under the control of an operator whoe can be stationed in a remote location such as in a control tower. car men working around the train do not have to be present for the test and they are not involved in obtaining a pass or fail indication. A pass or fail indication is indicated to the operator at the control panel in a positive manner, which minimizes the possibility of a release of a marginally unsafe train. The system also provides for retesting after repairs of leakages, the retesting being accomplished in a manner that minimizes the testing time by automatically eliminating the 11 minute initial charging time period.

Although particular embodiments of the invention have been described and illustrated herein, it is recognized that modifications and variations may readily occur to those skilled in the art and consequently, it is intended that the claims be interpreted to cover such modifications and equivalents.

The embodiments of the invention in which an exclusive property or privilege is claimed are defined as follows:

1. In a railroad yard testing system for automatically charging and testing the air systems of trains of a variety of lengths by charging the train air brake system to a high pressure and then determining whether the pressure undergoes a predetermined leakage-caused reduction during a leakage-test period, the improvement of apparatus for automatically charging the train air system from a yarn air supply comprising:
   a coupling assembly for coupling the yard air supply to the head end of a train air system, including an orifice means for providing a pressure drop during air flow and a solenoid valve operable to disconnect the air supply from the air system;
   a first pressure transducer operable to generate a signal when the pressure in the system rises beyond a predetermined level;
   means coupled to the first pressure transducer, for maintaining the solenoid valve open until said predetermined pressure is reached;
   a timer coupled to the solenoid valve and operable to keep the valve open regardless of pressure, during a predetermined time period after the timer is placed in an operable state;
   starting means for placing the first transducer and timer in operable states; and means respective to the pressure at the coupling assembly reaching a predetermined level after said predetermined time period, for initiating a pressure reduction and testing cycle, whereby to assure that the entire train air supply has been adequately charged regardless of train length, by measuring air pressure only at the head end of the train.

2. The improvement described in claim 1 including:
   a manually operable retest switch; and
   means coupling the retest switch to the first pressure transducer and bypassing the timer, to operate the transducer to keep the solenoid valve open only until said predetermined pressure is reached, even if said predetermined pressure is reached after a short period of time less than said predetermined time period of the timer.

3. The improvement described in claim 1 including:
   a solenoid pressure relief valve connected to the coupling assembly to allow the escape of air;
   a second transducer operable by said initiating means, for opening said relief valve until a predetermined second pressure is reached at the coupling assembly;
   a third transducer for generating a signal when a predetermined third pressure, which is less than said second pressure, is reached at the coupling assembly;
   a timer;
   means coupled to said second transducer, for starting said timer after the pressure is reduced to said second pressure; and
   pass-fail indicator means coupled to the timer and to the third transducer for generating a pass indication at the end of the timing period of the timer if the third pressure is not reached, and for generating a fail indication at the end of the timing period if the third pressure has been reached.

4. Apparatus for testing the air brake system of a train comprising:
   yard air supply means for supplying air at a pressure exceeding 75 psi.
   a coupling assembly for coupling and controlling the yard air supply means to the train air system, including an orifice member for limiting the air flow rate, a first solenoid valve operable to close and open the flow of air from the yarn supply means to the train air system, and a reduction solenoid valve operable to bleed off air from the train air system;
   a 75 psi transducer coupled to the coupling assembly, for generating a predetermined signal when the pressure thereat reaches 75 psi;
   means for coupling said 75 psi transducer to said first solenoid valve, to keep the valve open until the pressure rises to 75 psi at the coupling assembly;
   a first timer coupled to said first solenoid valve for keeping it open for a predetermined time period on the order of 11 minutes, regardless of the pressure thereat having reached 75 psi;
   a 60 psi transducer coupled to the coupling assembly, for generating a predetermihed signal when the pressure thereat reaches 60 psi;
   second means for coupling said 60 psi transducer to said reduction solenoid valve for keeping the reduction valve open until the pressure falls to 60 psi at the coupling assembly;
   a 55 psi transducer coupled to the coupling assembly, for generating a predetermine signal when the pressure thereat reaches 55 psi;
   a test period timer responsive to the 60 psi transducer to initiate a test period on the order of one minute;
   a pass indicator circuit coupled to the 55 psi transducer and the test period timer, for generating a pass indication at the end of the test period if and only if the 55 psi transducer fails to sense a pressure below 55 psi; and
   a fail indicator coupled to the 55 psi transducer and the test period timer, for generating a fail indication if and only if the 55 psi transducer senses a pressure below 55 psi prior to the end of the test period.

5. A method for testing the air brake system of a train of railroad cars comprising:

flowing air from a yard air supply that supplies air at a pressure exceeding 75 psi to the head end of the train through an orifice, for a period of about 11 minutes, and continuing to flow the air until the pressure increases to 75 psi at the downstream side of the orifice;

bleeding off the air from the downsteam side of the orifice until a second pressure is reached; and generating an indication, at a predetermined time after said second pressure is reached, the indication being a pass indication if the pressure exceeds a third pressure at the time of the generation of the indication and being a fail indication if the pressure is less than the third pressure.

* * * * *